July 29, 1930.    C. B. BAILEY    1,771,604
GASKET
Filed May 20, 1926
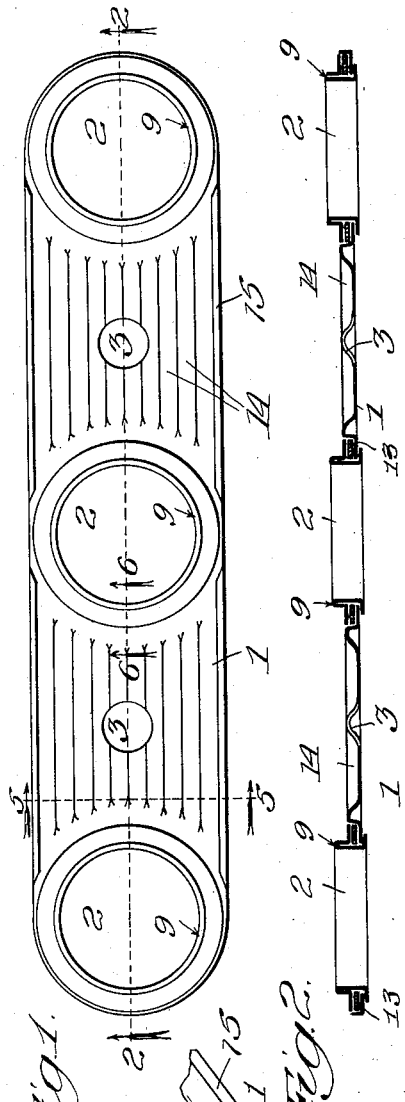
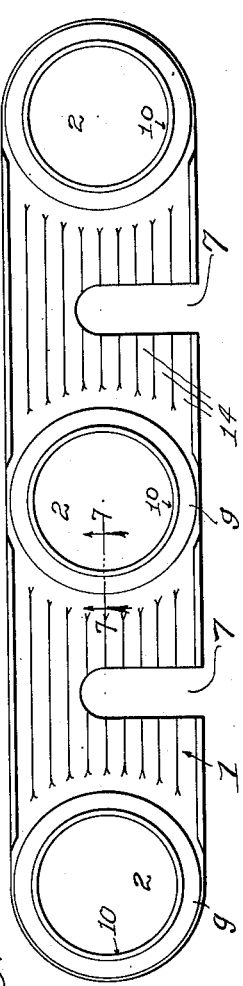
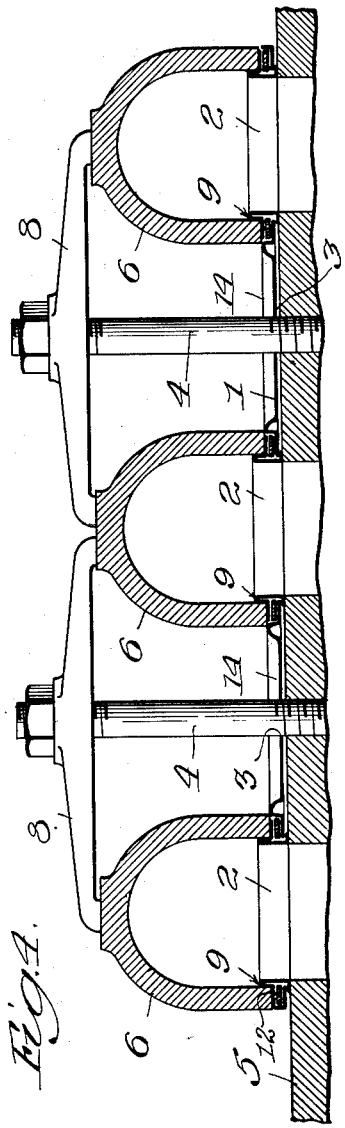
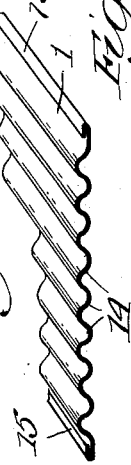
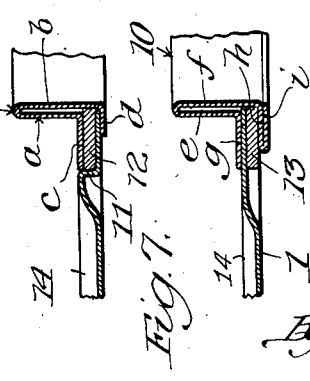
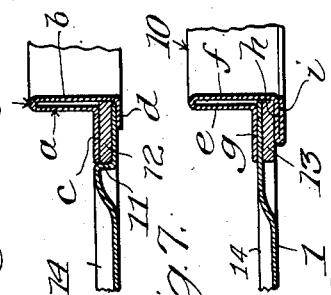
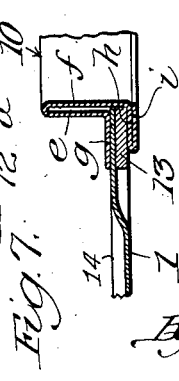
Inventor:
Claude B. Bailey, Patented July 29, 1930

1,771,604

UNITED STATES PATENT OFFICE

CLAUDE B. BAILEY, OF WYANDOTTE, MICHIGAN, ASSIGNOR TO McCORD RADIATOR & MFG. CO., OF DETROIT, MICHIGAN, A CORPORATION OF MAINE

GASKET

Application filed May 20, 1926. Serial No. 110,321.

This invention has particular reference to manifold gaskets, such as are elongated or in strip form and having stud openings and port holes spaced apart lengthwise of the gasket body so that single gaskets may accommodate a plurality of port openings in the cylinder block and associated manifold pipes, as in automobile engines of the Ford type.

In my copending application, Serial No. 106,354, filed May 3, 1926, I have disclosed and claimed a manifold gasket having a body portion of a single layer of sheet metal with corrugations therein between the port holes to stiffen the body layer against bending and distortion, and also with tubular guides formed integral with the body layer at the respective port holes so that the guides and the body layer may be made from a single piece of sheet metal.

It is the object of the invention set forth in this present application to form the guides independent of the body layer and clamp them to the same by metal flanges on the guides on opposite sides of the body layer, so that these flanges may increase the amount of sheet metal at the pressure receiving and joint sealing sections of the gasket about the guides.

The invention consists further in the matters hereinafter described and claimed.

In the accompanying drawings—

Fig. 1 is a top plan view of a manifold gasket constructed in accordance with my invention;

Fig. 2 is a vertical sectional view taken on line 2—2 of Fig. 1;

Fig. 3 is a top plan view of a gasket corrugated as in Fig. 1 and with the stud openings slotted in the body layer instead of being in the form of holes as in Fig. 1;

Fig. 4 is a vertical sectional view showing a gasket clamped in place between a cylinder block and its associated manifold pipes;

Fig. 5 is a cross-section in perspective, taken on line 5—5 of Fig. 1;

Fig. 6 is an enlarged vertical sectional view through one of the guides of the gasket of Fig. 1, taken on line 6—6 of Fig. 1; and Fig. 7 is an enlarged vertical sectional view through one of the guides of the gasket of Fig. 3, taken on line 7—7 of Fig. 3.

The manifold gasket shown in the drawings has a relatively narrow and elongated body portion 1 of a single layer of sheet metal, such as copper, brass, aluminum, zinc, or the like. The body layer 1 is provided with a plurality of port holes 2, 2 of the same size and spaced apart lengthwise of the layer, as shown in the drawings. In the gasket shown in Figs. 1 and 2, the layer 1 is provided with a plurality of holes 3, 3, smaller than the port holes 2 and arranged between them to receive the studs or bolts 4 for holding the gasket in position between a cylinder block 5 and its associated manifold pipes 6, 6, as shown in Fig. 4. In the gasket shown in Fig. 3, the openings through the body layer 1 for the studs 4 are in the form of slots 7, 7 extending through one side edge of the layer. These slots permit the gasket to be applied edgewise over the studs 4, 4 without the necessity of first removing the manifold clamps 8 from the studs, as required when the stud openings in the gasket are in the form of holes 3, as shown in the gasket in Figs. 1 and 2.

The gasket is provided with a plurality of tubular guides about the respective port holes 2 and projecting outward from the plane of the body layer 1 from one side of the same. There is a slight difference in the structure with respect to the guides of the gaskets shown in Figs. 1 and 3. This difference is clearly illustrated in Figs. 6 and 7, the first figure indicating the structure of the guides 9 of the gasket of Fig. 1, and the other figure illustrating the structure of the guides 10 of the gasket of Fig. 3.

As shown in Fig. 6, the body layer 1 about a port hole 2 is provided with an annular depression or pocket 11 to receive an asbestos or like ring 12. The guide 9 is made of sheet metal independent of the layer 1, and is folded on itself to provide inner and outer annular portions $a$, $b$ integrally connected by the fold in the metal along the outer edge of the guide. The outer member $a$ is provided with a base flange $c$ extending completely about the guide and bearing on the ring 12 to hold the same in the pocket 11 and against the layer 1. This flange c is as wide as the ring so as to extend over and cover the portion of the ring engaged thereby. The inner member b extends through the port hole 2 in the layer 1 and also through the ring 12 to shield the inner edge of the same, and has its marginal portion flanged outward, as at d. This flange overlaps the surface of the layer 1 on the side opposite the flange c. The flanges c, d serve to clamp the ring 12 in the pocket 11 and against the body layer of the gasket. The rings 12, together with the metal layers afforded by the body and flanges, provide the cushions required for the gasket and permit the making of tight joints about the rings when the gasket is clamped in place between a cylinder block and its manifold pipes. The ends of the layer 1 are flanged up to extend over and shield the rings at the ends of the gasket, as shown in Fig. 2.

The guide 10, shown in Fig. 7, is also formed of sheet metal independent of the body layer 1, and is folded on itself to provide inner and outer annular members e, f, with the fold in the metal at the outer edge of the guide as before. The outer member e has a base flange g seating against the portion of the body layer 1 immediately surrounding the port hole. The inner member f extends through the port hole in the layer and also through an asbestos ring 13, which is on the side of the layer 1 opposite the flange g. The marginal portion of the member f is flanged outward and overlaps the under side of the ring 13 to hold the same against the body layer. This flange of the member f is folded or doubled on itself to provide two overlapping layers h, i integrally connected by the fold between the layers, as shown in Fig. 7. In this form four layers of sheet metal are provided for the pressure receiving and joint sealing sections of the gasket, instead of three layers as in Fig. 6. Thus by making the guides independent of the body layer and having flanges to clamp the guides to the body layer, the amount of metal required at the joint sealing sections may be proportioned to that required for the finish of the surfaces between which the gaskets are clamped.

To stiffen the layer 1 against bending and distortion, I provide the layer with a plurality of corrugations 14, 14. These extend lengthwise of the layer 1 and so stiffen and strengthen the same that the body of the gasket may be made of a single layer of sheet metal of a relatively thin gauge. As shown in the drawings, the corrugations are disposed over the entire surface of the layer between the port holes 2, 2. They terminate short of the portions of the layer immediately surrounding the port holes, where the pressure and joint sealing sections of the gasket are made, as shown in Figs. 1 and 3.

By corrugating the body layer, the gasket may be made cheaper and will stand up to better advantage, due to the elimination of excess material heretofore required to make gaskets stiff enough for manifold purposes. Moreover, by reason of the corrugations, the gasket layer may be provided with the slotted stud holes 7, 7, as the corrugations stiffen the layer sufficiently to permit the use of these slotted stud holes without so weakening the material as to fracture or break at the inner ends of the slots. The side edges of the body layer may be strengthened by bending over the same, as at 15, 15 in Figs. 1 and 5. These folds are made between the port holes 2, 2 and are parallel to the corrugations, as shown.

The details of structure may be variously changed and modified without departing from the spirit and scope of my invention.

I claim as my invention:

1. A manifold gasket having a body portion in strip form of a single layer of sheet metal with stud openings and port holes therein and spaced apart lengthwise of the gasket body, said body layer being bent about the respective port holes to form annular recesses, asbestos rings in said recesses, tubular guides made independent of the body layer and inserted in the respective port holes, said guides projecting outward from the plane of the body layer and having inner and outer annular portions with flanges on opposite sides of the body layer and engaging the latter and the rings, respectively, for holding the rings against the body layer and in said recesses, the inner portion of the guides extending through the rings and port holes, and corrugations provided in the body layer between the guides and rings and extending lengthwise of the body layer, said corrugations being substantially parallel to each other and to the side edges of the body layer and terminating short of said rings and recesses.

2. A manifold gasket having a body portion in strip form of a single layer of sheet metal and having stud openings and port holes therein spaced apart lengthwise of the gasket body, said body layer being bent about the respective port holes to form annular recesses, asbestos rings in said recesses, and tubular guides made independent of the body layer and inserted in the respective port holes, said guides projecting outward from the plane of the body layer and having inner and outer annular portions with flanges on opposite sides of the body layer and engaging the latter and the rings, respectively, for holding the rings in the recesses.

In testimony whereof I affix my signature this 5th day of May, 1926.

CLAUDE B. BAILEY.